United States Patent [19]

Shimizu

[11] Patent Number: 4,735,271
[45] Date of Patent: Apr. 5, 1988

[54] MOTOR-DRIVEN POWER STEERING SYSTEM FOR VEHICLES

[75] Inventor: Yasuo Shimizu, Saitama, Japan

[73] Assignee: Honda Giken Kogyo Kabushiki Kaisha, Tokyo, Japan

[21] Appl. No.: 907

[22] Filed: Jan. 6, 1987

[30] Foreign Application Priority Data

Jan. 14, 1986 [JP] Japan .................................. 61-6079
Jan. 14, 1986 [JP] Japan .................................. 61-6080
Apr. 17, 1986 [JP] Japan .................................. 61-89115
Apr. 17, 1986 [JP] Japan .................................. 61-89116

[51] Int. Cl.$^4$ ............................................. B62D 5/08
[52] U.S. Cl. .................................. 180/79.1; 180/142; 364/424; 318/432
[58] Field of Search ............... 180/79.1, 142; 364/424, 364/424.1; 318/432, 489, 624

[56] References Cited

U.S. PATENT DOCUMENTS 4,651,840  3/1987  Shimizu .............................. 180/79.1
4,657,103  4/1987  Shimizu .............................. 180/79.1

Primary Examiner—John J. Love
Assistant Examiner—Donn McGiehan
Attorney, Agent, or Firm—Armstrong, Nikaido, Marmelstein & Kubovcik

[57] ABSTRACT

A motor-driven power steering system for vehicles includes a control device which is responsive to output signals from a torque detector mechanism which detects a steering torque acting on an input shaft, for applying a driving signal to an electric motor to produce an assistive torque to be imposed on the output shaft. The power steering system further includes a device for detecting a freely returning state of a steering wheel to produce a motor damping signal and a motor damping device for damping the electric motor in response to the motor damping signal.

11 Claims, 9 Drawing Sheets

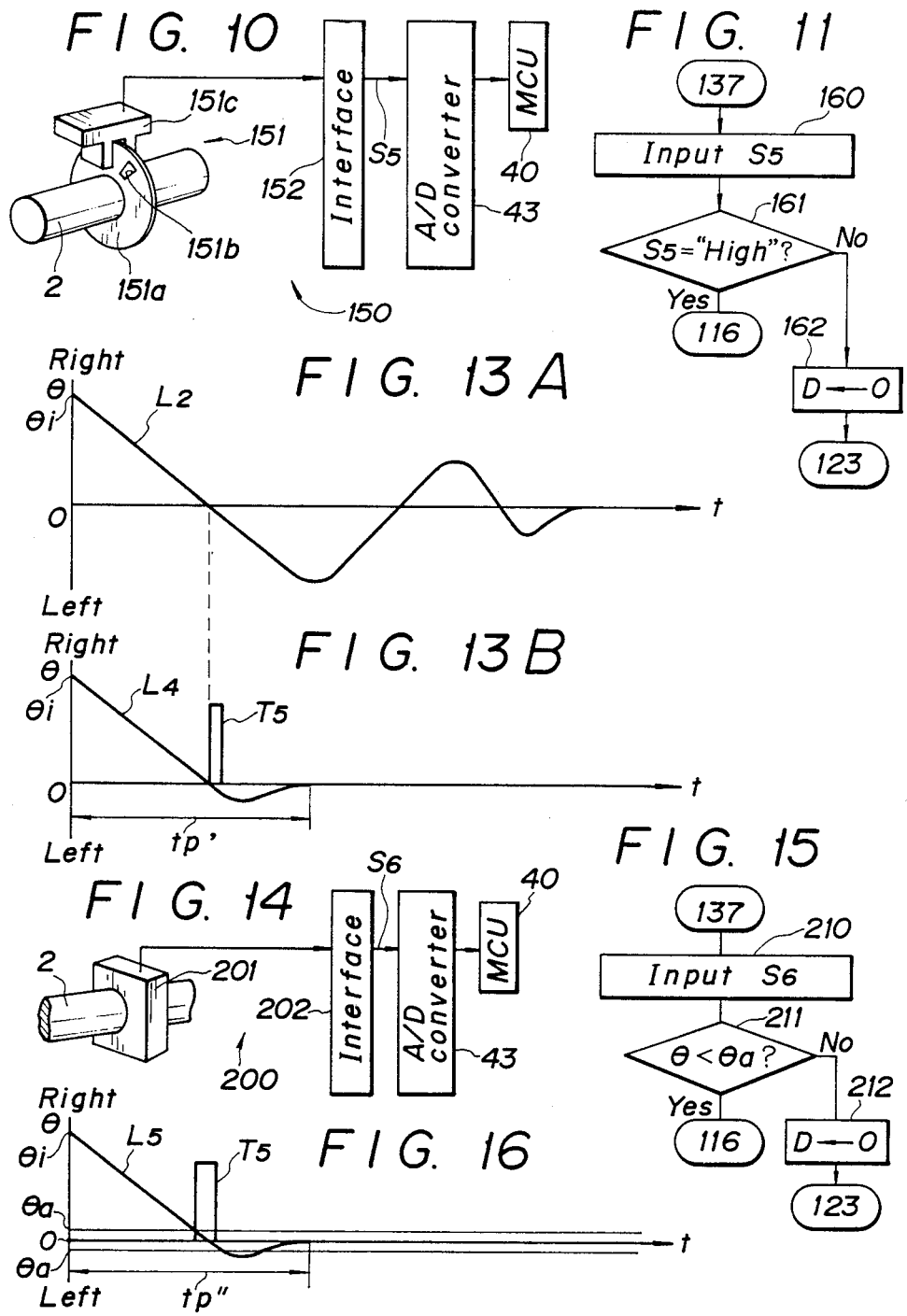

MOTOR-DRIVEN POWER STEERING SYSTEM FOR VEHICLES

BACKGROUND OF THE INVENTION

1. Field of the Invention

The present invention relates to a motor-driven power steering system for vehicles such as automobiles, and more particularly to a motor-driven power steering system having a steering servo unit including an electric motor for producing assistive steering torque.

2. Description of the Relevant Art

Various electric or motor-driven power steering systems for automobiles have been proposed in recent years in view of the structural complexities of conventional hydraulically operated power steering systems.

One example of such an automotive motor-driven power steering system is disclosed in UK patent application No. 2,132,950 A published on July 18, 1984. The disclosed motor-driven power steering system has a steering servo unit using a low-torque, high-speed electric motor as a power source and a control apparatus for the steering servo unit. When a steering wheel is turned, the steering torque applied to the input shaft of the steering system which is coupled to the steering wheel is detected, and the motor is controlled by the detected steering torque. Assistive torque produced by the motor is transmitted via a speed reducer to the output shaft of the steering system. The speed reduction ratio of the speed reducer is selected to be high since the motor rotates at high speed. The assistive torque applied to the output shaft of the steering system helps the driver turn the steering wheel with reduced manual forces, resulting in improved drivability and steering feeling.

General automotive steering systems including manually operated steering systems have two modes or states. In one state, the driver imposes steering forces on the steering wheel, and in the other state, the driver applies no steering forces to the steering wheel. While the automobile is turning with steerable or dirigible wheels, which are front wheels in most cases, being steered in one direction, the front wheels are subjected to a force tending to return themselves back to their central or neutral position. Such a returning force is produced by the front wheel alignment or self-aligning torque arising from elastic deformation of the front wheels. The returning force is increased as the speed of the automobile becomes higher. When the driver stops applying the steering force to the steering wheel, with his or her hands released or not, at the time the dirigible wheels have been steered a certain angle, the steered wheels are apt to return to the neutral position. At the same time, the steering wheel also tends to return to its neutral position. Such a returning state will hereinafter be referred to as a "freely returning state".

In manually operated steering systems with no steering servo unit, the steering angle varies according to a curve L1 of FIG. 8A of the accompanying drawings during the freely returning state of the steering wheel. In FIG. 8A, the vertical and horizontal axes represent the steering angle $\theta$ and time t, respectively. The graph of FIG. 8A is plotted under such conditions in which the driver stops applying the steering force to the steering wheel when the steering wheel has been turned $\theta i$ clockwise from the neutral position ($\theta = 0$) at a certain automobile speed. As shown in FIG. 8, the steering wheel repeatedly overshoots the neutral position until finally it returns or settles to the neutral position in a time tm.

Now, it is assumed that the steering wheel of the motor-driven power steering system, as described above, enters the freely returning state under the same conditions as those described above with respect to the manually operated steering system. At this time, the motor is rotated by the steered wheels through the speed reducer, and hence acts as a load on the steered wheels. As a result, the rate of change of the steering angle per unit time is smaller than that of the manually operated steering system. Stated otherwise, the period of reciprocating rotational movement of the steering wheel is longer than that of the manually operated steering system. Furthermore, since the moment of inertia of the motor acts on the steered wheel at a rate which is the square of the speed reduction ratio of the speed reducer, the overshooting of the steering wheel from the neutral position is larger than that of the manually operated steering system. Under the freely returning state of the steering wheel, the steering angle $\theta$ changes according to a curve L2 of FIG. 8B. The settling time Te in which the steering wheel returns to its neutral position is considerably longer than the settling time Tm of the manually operated steering system. Thus, the steering wheel of the motor-driven power steering system returns to the neutral position relatively slowly.

The present invention has been made in an effort to solve the aforesaid problems of the conventional motor-driven power steering system.

SUMMARY OF THE INVENTION

It is an object of the present invention to provide a motor-driven power steering system for vehicles which allows a steering wheel to return to its neutral position relatively quickly under the freely returning state.

To achieve the above object, there is provided in accordance with the present invention a motor-driven power steering system for a vehicle, comprising an input shaft operatively coupled to a steering wheel, an output shaft operatively coupled to a dirigible wheel, an electric motor for applying an assistive torque to the output shaft, torque detecting means for detecting a steering torque imposed on the input shaft, control means responsive to output signals from the torque detecting means for applying a driving signal to the electric motor, means for detecting a freely returning state of the steering wheel to generate a motor damping signal, and damping means responsive to the motor damping signal for damping the electric motor.

The above and further objects, details and advantages of the present invention will become apparent from the following detailed description of preferred embodiments thereof, when read in conjunction with the accompanying drawings

BRIEF DESCRIPTION OF THE DRAWINGS

FIG. 10 is a perspective view, partly in block form, of a motor-driven power steering system according to a first modification;

FIG. 11 is a flowchart of a portion of the control sequence of the power steering system illustrated in FIG. 10;

FIG. 13A is a view similar to FIG. 8B;

FIG. 13B is a graph showing the manner in which the steering angle of a steering wheel of the motor-driven power steering system of the first modification varies when the steering wheel is in freely returning state;

FIG. 14 is a perspective view, partly in block form, of a motor-driven power steering system according to a second modification;

FIG. 15 is a flowchart of a portion of the control sequence of the power steering system depicted in FIG. 14;

FIG. 16 is a graph showing the manner in which the steering angle of a steering wheel of the motor-driven power steering system of the second modification varies under freely returning state;

DETAILED DESCRIPTION OF THE PREFERRED EMBODIMENTS

Figure 1:
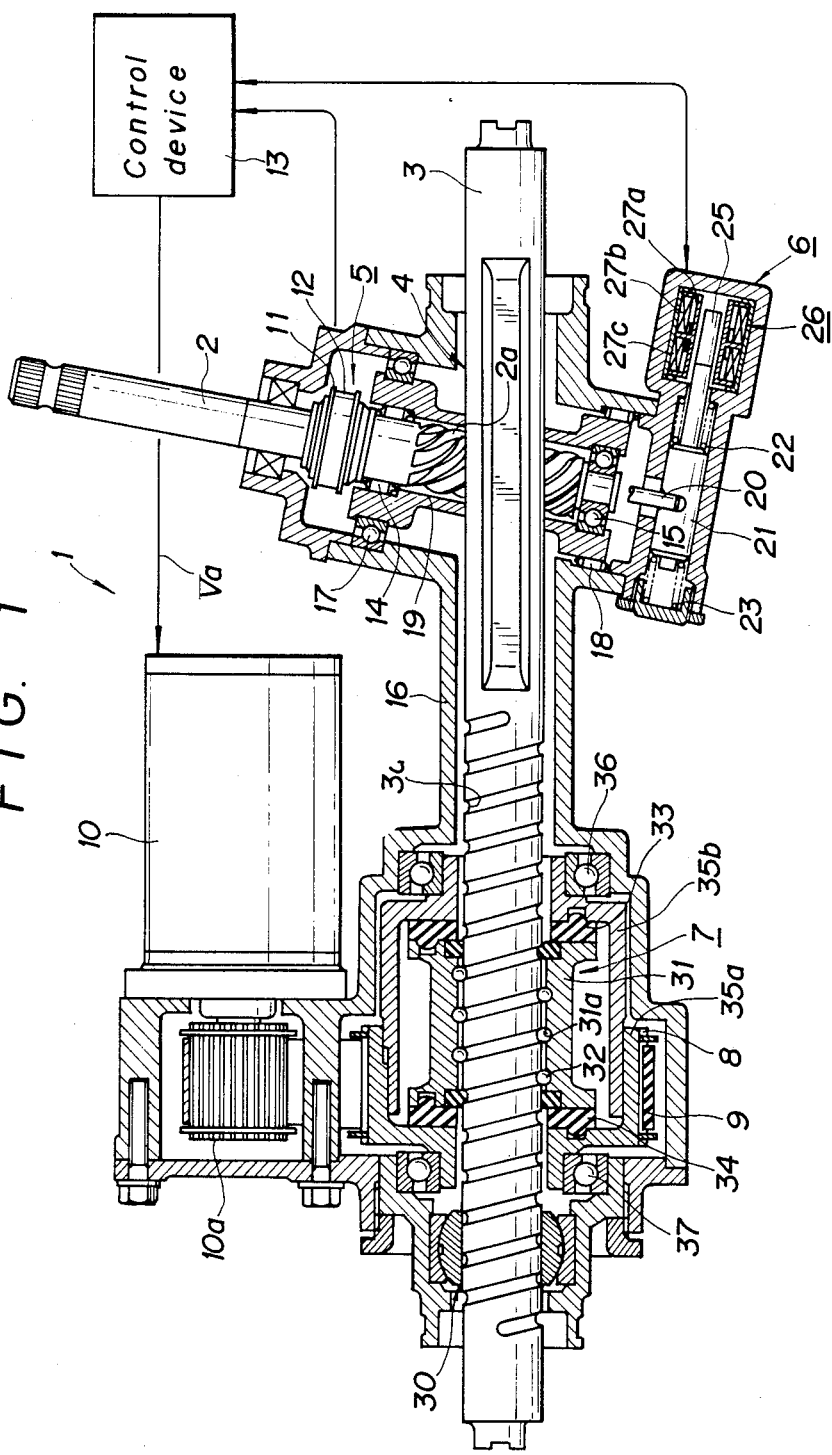
FIG. 1 is a longitudinal cross-sectional view, partly in block form, of a motor-driven power steering system for vehicles according to a first embodiment of the present invention.

FIG. 1 shows a motor-driven power steering system for vehicles such as automobiles according to a first embodiment of the present invention. The power steering system, generally designated by the reference numeral 1, has a pinion shaft 2 operatively coupled to a steering wheel (not shown) through a constant-velocity universal joint (not shown) and a steering shaft (not shown), and a rack shaft 3 having rack teeth 4 defined on its back and held in mesh with a pinion gear 2a defined on a lower portion of the pinion shaft 2. Therefore, rotation of the steering wheel is converted by the pinion shaft 2 to linear motion of the rack shaft 3. The pinion shaft 2 and the rack shaft 3 serve respectively as input and output shafts. The rack shaft 3 has its opposite ends connected by tie rods (not shown) to the knuckles of steerable or dirigible wheels (not shown).

Around the pinion shaft 2, there are disposed a steering speed sensor 5 above the rack shaft 3 and a steering torque sensor 6 below the rack shaft 3. A DC motor 10 for generating assistive steering torque is positioned near the rack shaft 3 remotely from the rack teeth 4. The motor 10 has its output shaft supporting a toothed pulley 10a that is operatively coupled by a timing belt 9 to a larger-diameter pulley 8 disposed around the rack shaft 3. Thus, rotation of the motor 10 is transmitted via the pulley 10a and the timing belt 9 to the larger-diameter pulley 8. Rotation of the larger-diameter pulley 8 is in turn transmitted to the rack shaft 3 through a ball screw mechanism 7 disposed around the rack shaft 3. The toothed pulley 10a, the timing belt 9, the larger-diameter pulley 8, and the ball screw mechanism 7 jointly constitute a speed reducer for reducing the speed of rotation of the motor 10 and transmitting the rotation of the motor 10 at a reduced speed to the rack shaft 3 to enable the rack shaft 3 to make linear motion. The motor 10 is controlled by a control device 13, as described later on.

The steering speed sensor 5 comprises a DC generator or tachogenerator (not shown) located behind the pinion shaft 2, a smaller-diameter toothed pulley (not shown) mounted on one end of the shaft of the DC generator, a larger-diameter toothed pulley 11 mounted on the pinion shaft 2, and a timing belt 12 trained around these pulleys. The DC generator of the steering speed sensor 5 generates a DC voltage having a polarity dependent on the direction in which the pinion shaft 2 rotates and a magnitude proportional to the speed of rotation of the pinion shaft 2. The output signal from the steering speed sensor 5 is applied to the control device 13. The steering speed sensor 5 may be operatively coupled to the output shaft 3, rather than the input shaft 2.

The steering torque sensor 6 comprises a pinion holder 19 rotatably disposed around the pinion gear 2a, a piston 21 axially movable by a pin 20 integral with the pinion holder 19 in response to rotation of the pinion hodler 19, a pair of springs 22, 23 disposed on opposite sides of the piston 21 for normally urging the piston 21 toward its central or neutral position, and a differential transformer 26 coupled to the piston 21 for converting axial displacement of the piston 21 to an electric signal. The pinion holder 19 is rotatably supported in a casing 16 by means of a pair of bearings 17, 18, and the pinion gear 2a is rotatably supported in the pinion holder 19 by means of bearings 14, 15. The rotational axis of the pinion gear 2a is radially displaced from the rotational axis of the pinion holder 19. When the steering wheel is in its neutral position and the steering torque Ts is zero, a straight line interconnecting the rotational axes of the pinion gear 2a and the pinion holder 19 extends substantially perpendicularly to the longitudinal axis of the rack shaft 3. In case a load on the rack shaft 3 is larger than the steering torque acting on the pinion gear 2a, the pinion gear 2a is prevented from rotating about its own axis, but the pinion holder 19 is caused to rotate, due to meshing engagement of the pinion gear 2a and the rack teeth 4. Stated otherwise, the pinion gear 2a revolves around the axis of the pinion holder 19. The rotation of the pinion holder 19 is transmitted by the pin 20 to the piston 21, which is moved in its axial direction until it counterbalances the reactive forces from the springs 22, 23. Therefore, the axial displacement of the piston 21 is proportional to the steering torque Ts applied. To one end of the piston 21, there is attached an iron core 25 serving as a magnetic body axially movable with the piston 21. Axial displacement of the iron core 25 is detected by the differential transformer 26. The differential transformer 26 comprises a primary coil 27a and a pair of secondary coils 27b, 27c. The control device 13 applies an AC voltage to the primary coil 27a, and outputs from the secondary coils 27b, 27c are supplied to the control device 13. The amplitude of the outputs from the secondary coils 27b, 27c is differentially variable with the axial displacement of the iron core 25. The outputs from the secondary coils 27b, 27c serves as signals of detected steering torque which indicate the magnitude of the steering torque Ts and the direction in which it acts.

The rack shaft 3 has a helical screw groove 3a defined on a portion thereof remote from the rack teeth 4 meshing with the pinion gear 2a. The rack shaft portion with the helical screw groove 3 is supported in the casing 16 by a spherical bearing 30 for angular movement and axial sliding movement. The ball screw mechanism 7 comprises a ball nut 31 with a helical screw groove 31a defined in its inner circumferential surface. The ball nut 31 is disposed over the helical screw groove 3a, there being a plurality of balls 32 interposed between the ball nut 31 and the rack shaft 3. The balls 32 are received in the screw grooves 3a, 31a and roll therebetween in circulating motion through a circulatory path (not shown) in the ball nut 31. Consequently, rotation of the ball nut 31 is smoothly transmitted via the balls 32 to the rack shaft 3 for linearly moving the rack shaft 3. The ball nut 31 has its opposite ends resiliently clamped between pulley cases 35a, 35b through respective resilient members 33, 34. The pulley cases 35a, 35b are rotatably supported in the casing 16 via a pair of angular contact bearings 36, 37. The larger-diameter pulley 8 is mounted on the outer circumferential surface of the pulley case 35a.

The control device 13 will be described with reference to FIG. 2.

The control device 13 includes a microcomputer unit (hereinafter referred to as an "MCU") 40. The MCU 40 is supplied with detected steering torque signals S1, S2 from a steering torque detector circuit 41 and detected steering speed signals S3, S4 from a steering speed sensor 42 through an A/D converter 43 under commands of the MCU 40.

The steering torque detector circuit 41 comprises the steering torque sensor 6, and an interface 44 for supplying the primary coil 27a of the differential transformer 26 with an AC signal that is produced by frequency-dividing clock pulses T1 in the MCU 40 and for rectifying, smoothing, and converting the outputs from the secondary coils 27b, 27c to DC voltage signals S1, S2 which are then applied as the detected steering torque signals to the MCU 40.

The steering speed detector circuit 42 comprises the steering speed sensor 5, and an interface 45 for removing high-frequency components from the output signal produced from the output terminals of the DC generator of the sensor 5 to produce the detected steering speed signals S3, S4.

Although not specifically shown, the MCU 40 has an I/O port, memories (RAM, ROM), a CPU, registers, and a clock generator to which clock pulses from a quartz resonator are supplied.

The MCU 40 and other circuits are energized by a power supply circuit 46 comprises a relay circuit 49 connected via a fuse circuit 48 and an ignition switch to an automobile-mounted battery 47, and a voltage stabilizer 50. The relay circuit 49 has an output terminal 49a for supplying electric power to a motor driver circuit 51 (described later). The voltage stabilizer 50 has an output terminal 50a for supplying a constant voltage to the MCU 40, the steering torque detector circuit 41, and the steering speed detector circuit 42. When the ignition switch is turned on, the MCU 40 starts its operation to process the signals S1 through S4 from the detector circuits 41, 42 according to a program stored in the memory for applying driving signals T3, T4 and a damping signal T5 to the motor driver circuit 51. The driving signal T3 is a direction control signal indicating the direction in which the motor 10 is to rotate, and the driving signal T4 is a torque conrol signal for controlling the magnitude of an armature voltage Va. The signals T3 through T5 are control signals supplied to the motor driver circuit 51.

The motor driver circuit 51 comprises an interface 52 supplied with the control signals T3 through T5 and a bridge circuit 60 having four FETs 53, 54, 55, 56. The FETs 53, 56 on adjacent branches of the bridge circuit 60 have respective drain terminals coupled to the output terminal 49a of the relay circuit 49 of the power supply circuit 46. The source terminals of the FETs 53, 56 are coupled respectively to the drain terminals of the other FETs 54, 55. The FETs 54, 55 have their source terminals connected in common to the negative terminal of the battery 47 through a resistor 57a. The FETs 53, 54, 55, 56 have gate terminals joined respectively to output terminals 52a, 52d, 52b, 52c of the interface 52. The source terminals of the FETs 53, 56, which serve as output terminals of the bridge circuit 60, are coupled respectively to the input terminals of the motor 10, with a relay circuit 58 connected between the source terminal of the FET 56 and one of the input terminals of the motor 10.

The interface 52 is in response to the direction control signal T3 from the MCU 40 for issuing an ON/OFF output Q1 from the output terminal 52a or an ON/OFF output Q3 from the output terminal 52c to exclusively turn on the FET 53 or 56 in an on-driven mode (in which the FET is energized continuously), and at the same time for issuing a PWM signal Q2 from the output terminal 52b or a PWM signal Q4 from the output terminal 52d to exclusively bring the FET 55 or 54 into a PWM-driven mode (in which the FET is energized intermittently with modulated pulses). By thus driving the FETs selectively, the armature voltage Va of desired polarity and magnitude is applied to the motor 10 to drive the same. The PWM signals Q2, Q4 are produced by modulating the pulse duration of a rectangular pulse signal of fixed frequency and battery level with the motor voltage signal T4. Therefore, the PWM signals Q2, Q4 have modulated pulse durations for driving the corresponding FETs at variable duty ratios.

In accordance with the control signals T3, T4, the FET 53 is on-driven (i.e., energized continuously) and the FET 55 cooperating therewith is PWM-driven (i.e., energized intermittently) by the motor driver circuit 51, or the FET 56 is on-driven and the FET 54 cooperating therewith is PWM-driven by the motor driver circuit 51, for thereby controlling the direction in which the motor 10 is rotated and the output power thereof (rotational speed and torque).

In case the FETs 53, 55 are driven, the magnitude of the armature voltage Va is proportional to the pulse duration of the PWM signal supplied from the output terminal 52b of the interface 52, and the polarity of the armature voltage Va is such that an armature current Ia flows in the direction of the arrow A to rotate the motor 10 clockwise. Conversely, in case the FETs 56, 54 are driven, the magnitude of the armature voltage Va is proportional to the pulse duration of the PWM signal supplied from the output terminal 52d of the interface 52, and the polarity of the armature voltage Va is such that the armature current Ia flows in the direction of the arrow B to rotate the motor 10 counterclockwise.

The control device 13 also includes a current detecting circuit 57 for detecting malfunctions or abnormalities of the motor driver circuit 51. The current detecting circuit 57 serves to detect a current flowing through the resistor 57a which corresponds to the magnitude of the armature current Ia and to supply a detected current signal Sd to the MCU 40 through the A/D converter 43. Therefore, the current detecting circuit 57 detects a malfunction of the motor 10 or the motor driver circuit 51 with a current flowing through the resistor 57a. When such a malfunction is detected as indicated by the output signal Sd from the current detecting circuit 57, the MCU 40 applies a relay control signal T2 to the relay circuit 49 of the power supply circuit 46 and also to the relay circuit 58 coupled between the bridge circuit 60 and the motor 10 for thereby shutting off the electric power supplied from the power supply circuit 49 to the various circuits and also disconnecting the motor 10 from the motor driver circuit 51.

Operation of the MCU 40 will be described below.

A basic control sequence according to the present invention will first be described with reference to FIG. 3. This basic control sequence is executed also for first through sixth modifications and a second embodiment, which will be described later on.

Figure 4:
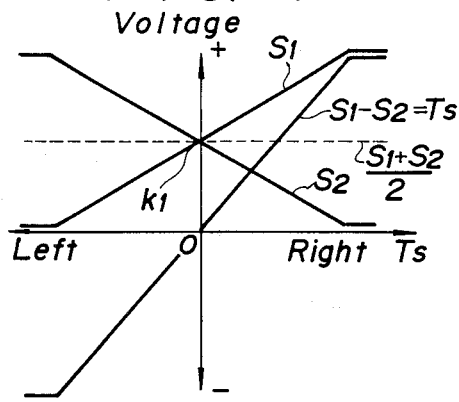
FIG. 4 is a graph showing signals of detected steering torque.

When the ignition switch is turned on, the MCU 40 and the other circuits are supplied with electric power from the power supply circuit 46 to start the control process in a step 100. First, the data items in the registers and the RAM of the MCU 40 and necessary circuits are initialized at a step 101. Then, initial failure diagnosis is executed in a step 102. More specifically, the internal circuits of the MCU 40 are checked for failures while stopping reading in of input signals from the A/D converter 43. If any failure is detected, then the MCU 40 stops its operation and hence the control device 13 is inactivated. If there is no failure, then the relay control signal T2 is supplied to the relay circuits 49, 58 to make the motor driver circuit 51 and the motor 10 ready for energization. Thereafter, whether the detected signal Sd from the current detecting circuit 57 is zero or not is checked. If the signal Sd is not zero, then it is determined that a malfunction takes place, and the relay circuits 49, 58 are de-energized. If the signal Sd is zero, then control goes from the step 102 to a step 103. In the step 103, the steering torque signals S1, S2 are successively read into the MCU 40. Then, a next step 104 ascertains whether the values of the signals S1, S2 are normal. FIG. 4 indicates that half of the sum of the signals S1, S2 is of a substantially constant value k1. In the step 104, the steering torque detector circuit 41 is determined as malfunctioning if the difference between $(S1+S2)/2$ and k1 does not fall within a predetermined range. When the steering torque Ts exceeds a prescribed value in each of the clockwise and counterclockwise directions of rotation of the steering wheel, the values of the signals S1, S2 remain constant as shown in FIG. 4 since the angle of rotation of the input shaft 2 and the axial displacement of the output shaft 3 are limited to certain ranges, respectively.

In the step 105, the difference $(S1-S2)$ is calculated and regarded as the value of steering torque Ts. In practical cases, in order to obtain one of continuous integers as the value of Ns, the value $(S1-S2)$ is multiplied by a predetermined numeral factor and then substituted for Ns.

The step 106 is followed by a step 105 which asertains whether the value of Ts is positive or negative in order to determine the direction in which the steering torque Ts acts. If the steering torque acts in the clockwise direction, i.e., if it is positive or zero, then a steering torque direction flag Fd is set to "1" in a step 107, and thereafter control proceeds to a routine 110 for detecting the freely returning state of the steering wheel. If the steering torque Ts is of a negative value in the step 106, then control goes from the step 106 to a step 108 in which the value of the steering torque Ts is converted to its absolute value. Thereafter, the steering torque direction flag Fd is reset to "0" in a step 109, which is followed by the routine 110.

The routine 110 contains steps 111 through 113 which are common in all of the embodiments and modifications, and steps 114, 115 which are unique for the respective embodiments and modifications.

The step 111 ascertains whether the value of the steering torque Ts is smaller than a torque Ts1 (FIG. 8B) of a relatively small value. If Ts is smaller than Ts1, then a first condition flag F1 is set to "1" in a step 112. Conversely, if Ts is not smaller than Ts1, then the first condition flag F1 is reset to "0" in a step 113. The first condition flag F1 will be combined with a second condition flag F2 (described later) for determining whether the steering wheel is in the freely returning state.

The step 114 is a second routine for detecting the freely returning state of the steering wheel. The step 114 is followed by a step 115 which asertains whether the steering wheel is in the freely returning state. If the steering wheel is in the freely returning state in the step 115, then control proceeds to a step 116. The steps 114, 115 will be described later in greater detail.

In the step 116, the driving signals Q3, Q1, Q2, Q4 applied to the FETs 56, 53, 55, 54 of the bridge circuit 60 are set as follows:

Q3="0", Q1="0"
Q2="1", Q4="1"

Then, the duty ratio D for driving the motor is set to "1" in a step 117, from which control goes to a step 124.

Figure 5:
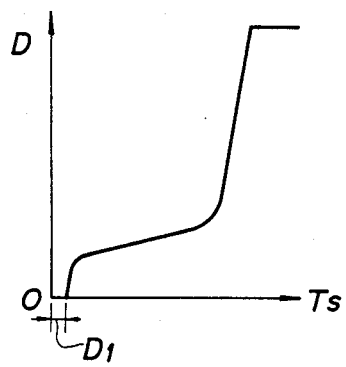
FIG. 5 is a graph showing the relationship between steering torque and the duty ratio of a motor driving signal.

If the steering wheel is not in the freely returning state in the step 115, then control goes to a step 118. In the step 118, a data item in a table stored in the ROM (not shown) is directly read out by addressing it based on the absolute value of the steering torque Ts. Specifically, the ROM table stores duty ratios D which are related to the absolute values of the steering torque Ts as shown in FIG. 5. Denoted at D1 is a dead zone. The duty ratios D are in the range of $0 \leq D \leq 1$. Therefore, the step 118 reads out a duty ratio D having an address corresponding to the absolute value of the steering torque Ts.

Thereafter, a step 119 checks if the read-out duty ratio D has a value greater than zero. If the duty ratio D is of a value greater than zero, then a step 120 ascertains whether the steering torque direction flag Fd which has been set in the steps 106 through 109 is "1" or not.

If the flag Fd is "1", i.e., if the steering torque Ts acts in the clockwise direction, then the driving signals Q3, Q1, Q2, Q4 are set in a step 121 as follows:

Q3="0", Q1="1"
Q2="1", Q4="0"

If the flag Fd is not "1", i.e., if the steering torque Ts acts in the counterclockwise direction, then the driving signals Q3, Q1, Q2, Q4 are set in a step 122 as follows:

Q3="1", Q1="0"
Q2="0", Q4="1"

If the duty ratio D is of a value not greater than zero, i.e., if it is equal to zero, in the step 119, then the driving signals Q3, Q1, Q2, Q4 are set in a step 123 as follows:

Q3="0", Q1="0"
Q2="0", Q4="0"

After the step 121, 122, or 123 has been executed, control goes to the step 124. The processing from the step 118 to the step 124 is a flow for ordinary motor control.

In the step 124, the driving signals Q3, Q1, Q2, Q4 as set in either the step 121, 122, 123, or 116 are applied to the interface 52. In a next step 125, the duty ratio D is applied to the interface 52. The duty ratio D represents a continuous pulse duration of the PWM signal Q2 or Q4. In the event that the steering wheel is not in the freely returning state, the duty ratio D is actually changed in order to match the motor speed Nm with the detected steering speed Ns. In this connection, the outputs processed in the steps 124, 125 are regarded as the motor control signals T3 through T5. Where the motor 10 is ordinarily driven, the motor 10 is rotated in a prescribed direction, and the generated torque is applied through the speed reducer to the output shaft 3 for reducing the manual steering force required.

When control has reached the steps 124, 125 via the steps 116, 117, the driving signals Q1 through Q4 have been set as follows

Q3="0", Q1="0"
Q2="1", Q4="1"

Figure 8A:
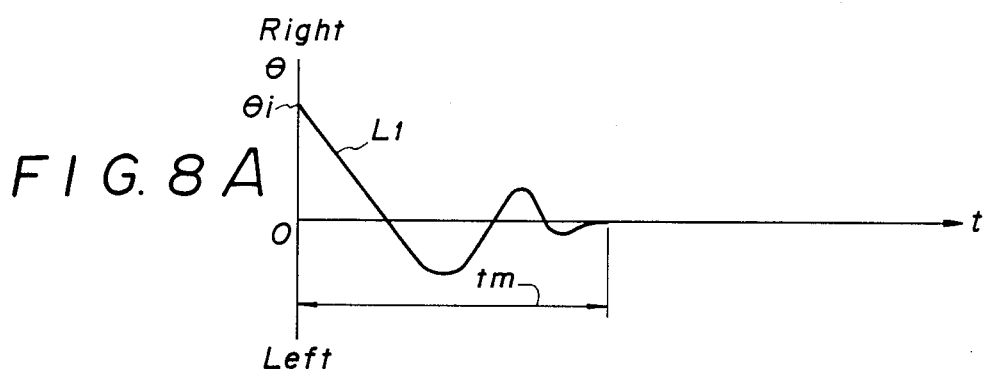
FIGS. 8A and 8B are graphs showing the manner in which the steering angles of steering wheels of a manually operated steering system and a conventional motor-driven power steering system, respectively, vary under freely returning states of the steering wheels.
Figure 8B:
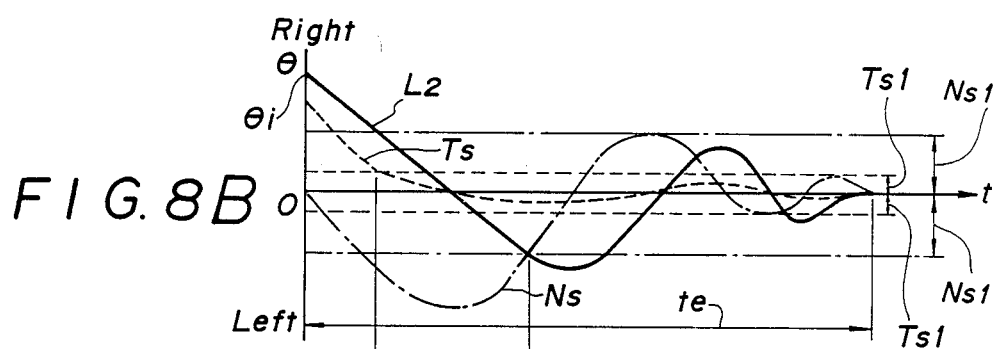
Figure 8C:
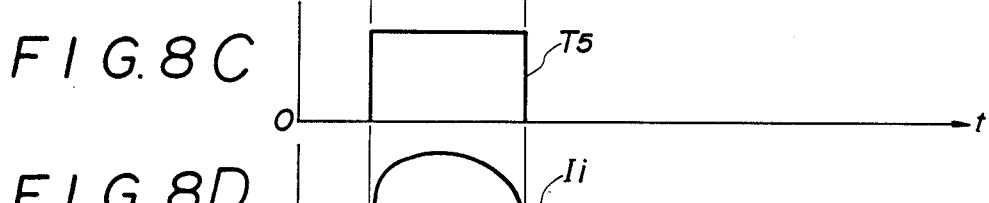
FIG. 8C is a graph showing a maximum range of the time in which a motor damping signal issued from the control device of FIG. 2 continues.
Figure 8D:
FIG. 8D is a graph of a self-damping current for a motor which is generated when the motor damping signal of FIG. 8C is produced.

Now, the FETs 53, 56 are not energized, and the FETs 54, 55 are energized continuously. Therefore, the input terminals of the motor 10 are short-circuited to cause the motor 10 to be self-braked by a counter electromotive force Vi generated by the rotation thereof. For example, in case the motor damping signal T5 with its pulse duration as shown in FIG. 8C is issued, a self-damping current Ii flowing in the direction opposite to the direction of rotation of the motor at this time is generated as shown in FIG. 8D. The self-damping current Ii is substantially proportional to the rotational speed Nm of the motor 10. the duration of the damping signal T5 is shorter than that of FIG. 8C as will be described with reference to FIG. 8E.

Control then goes from the step 125 to a step 126 which reads in the output signal from the current detecting circuit 57. A next step 127 determines an armature current Ia from the detected signal Sd thus read in. A step 128 then ascertains whether the value of Ia corresponds to the duty ratio D with a predetermined tolerance. If not, then it is determined that trouble has occurred, and the relay circuits 49, 58 are de-energized. If the armature current Ia corresponds to the duty ratio D, then control goes back to the step 103.

The steps 114, 115 will now be described with reference to FIG. 6. Steps 130 through 137 shown in FIG. 6 correspond to the steps 114, 115.

Figure 7:
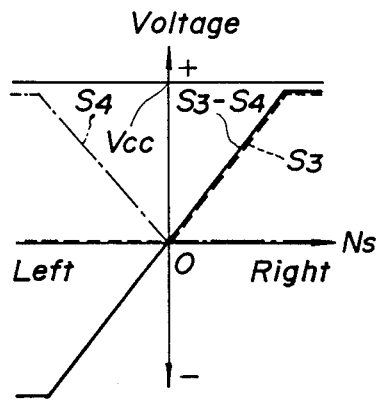
FIG. 7 is a graph illustrating signals of detected steering speed.

The step 130 reads in the detected signals S3, S4 from the steering speed detecting circuit 42, and the step 131 diagnoses whether the signal values thus read in are normal or not. If abnormal, then the relay circuits 49, 58 are de-energized. In the event that the steering speed detecting circuit 42 is normal, the steering speed Ns and the detected signals S3, S4 from the circuit 42 are of the mutual relationship as shown in FIG. 7. Therefore, when the DC voltage values of the detected signals S3, S4 are simultaneously positive, and when either one of the signals S3, S4 is substantially equal to the voltage Vcc of the voltage stabilizer 50, it is determined that the steering speed detecting circuit 42 is malfunctioning. The generator of the steering speed sensor 5 is selected such that its expected maximum output is lower than the voltage Vcc by a prescribed value.

Figure 3:
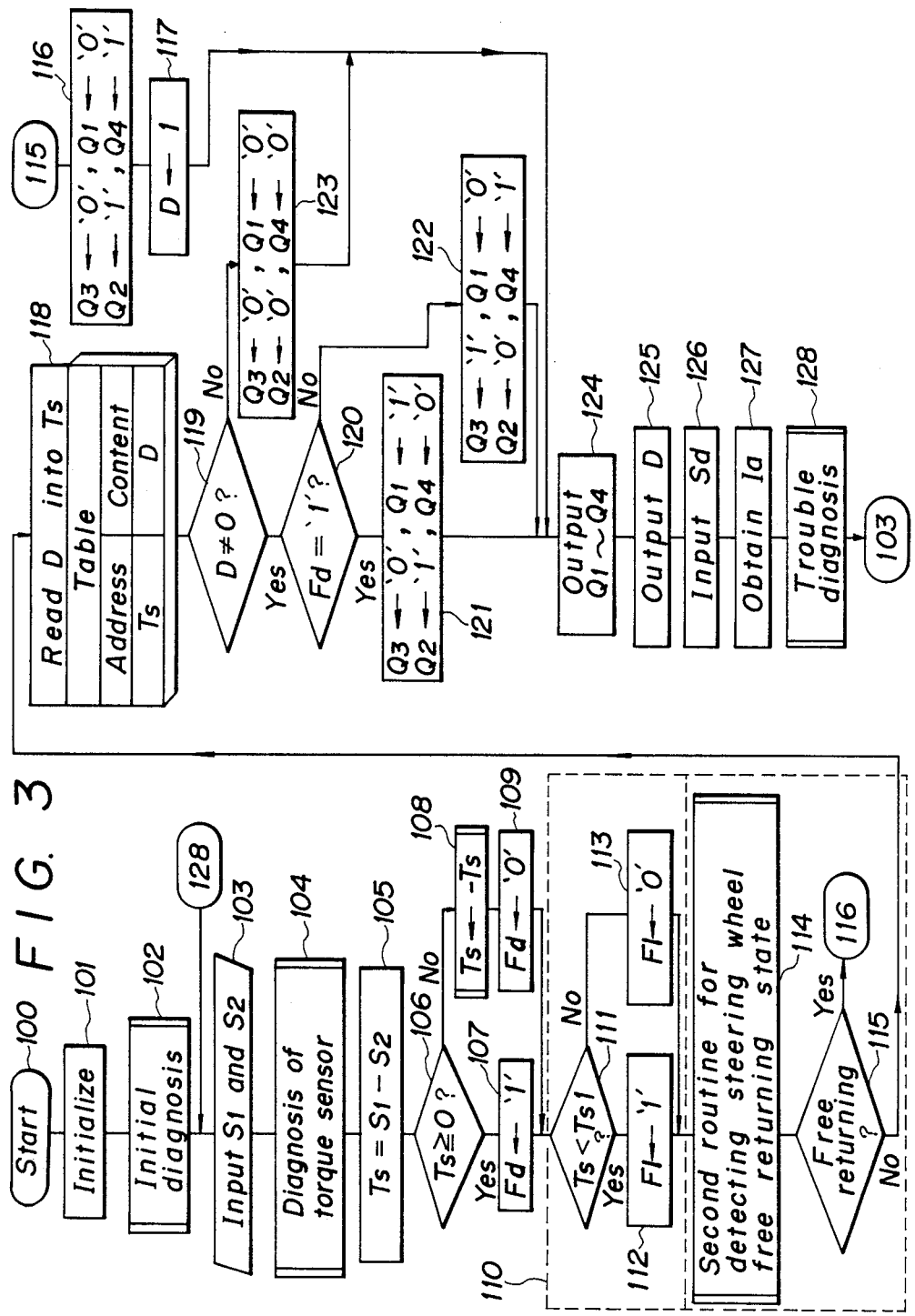
FIG. 3 is a flowchart of a basic operation sequence of the power steering system.

If the detected signals S3, S4 read in the step 130 are found normal in the step 131, then control proceeds to the step 132 in which the steering speed Ns is derived from the signals S3, S4 in the same manner as the process in the steps 105 through 109 of FIG. 3. More specifically, the calculation (S3−S4=Ns) is carried out, and the steering torque direction flag is set/reset according to the calculated result, and the absolute value of the steering torque is obtained.

The step 133 ascertains whether the steering speed Ns thus determined is larger than a prescribed steering speed Ns1 (FIG. 8B) having a relatively large value. If Ns is equal to or larger than Ns1, then a second condition flag F2 is set to "1" in a step 134. If Ns is smaller than Ns1, then the second condition flag F2 is reset to "0" in the step 135.

The step 136 checks if the first condition flag F1 is set to "1", and the step 137 similarly checks if the second condition flag F2 is set to "1". The first condition flag F1 has been determined in the step 112 or 113 (FIG. 3). If the flags F1, F2 are set to "1", then it is determined that the steering wheel is in the freely returning state, and control goes to the step 116 (FIG. 3). If at least one of the flags F1, F2 is not set to "1", then it is determined that the steering wheel is not in the freely returning state, and control proceeds to the step 118 (FIG. 3).

Figure 2:
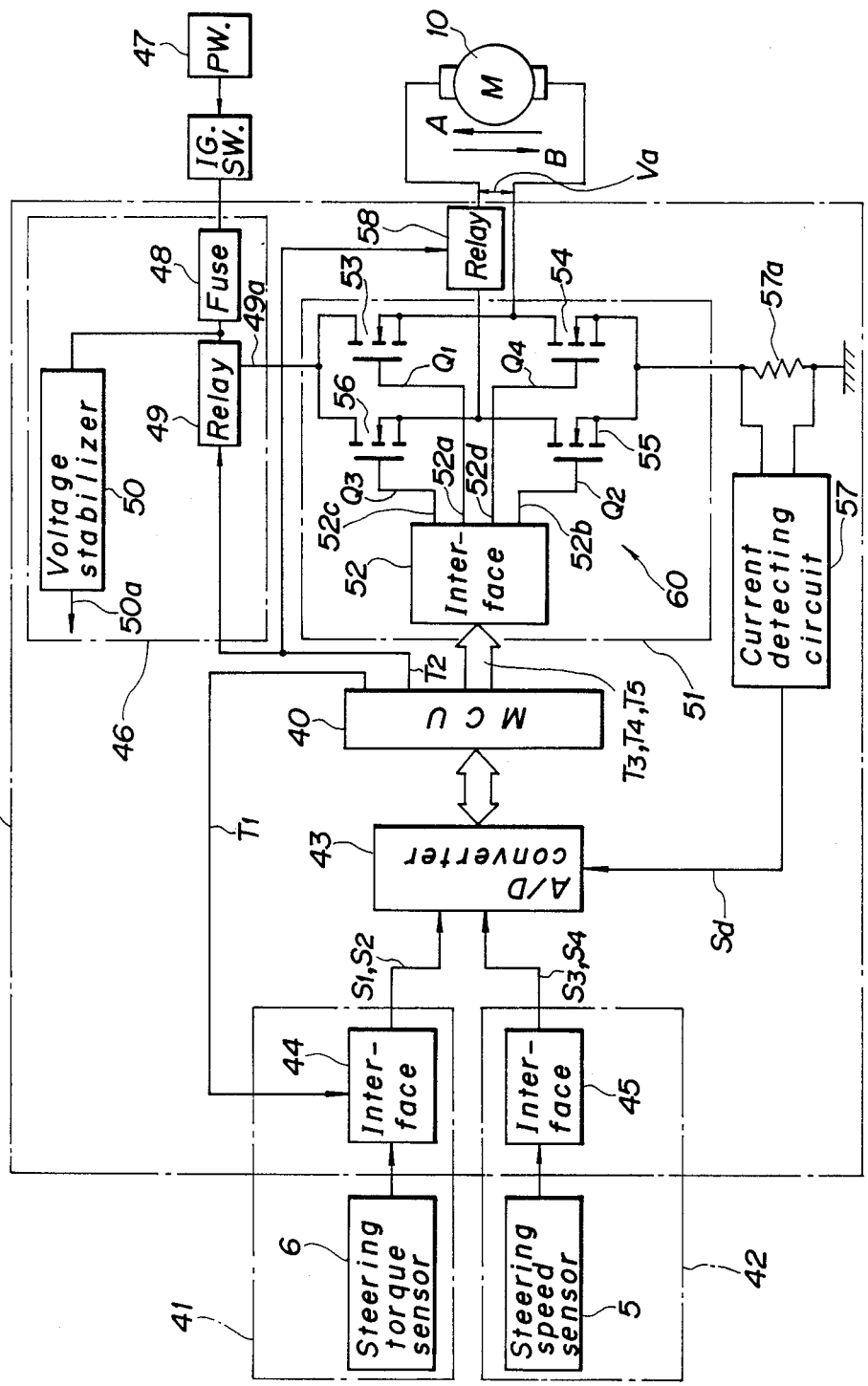
FIG. 2 is a block diagram of a control device of the motor-driven power steering system shown in FIG. 1.
Figure 6:
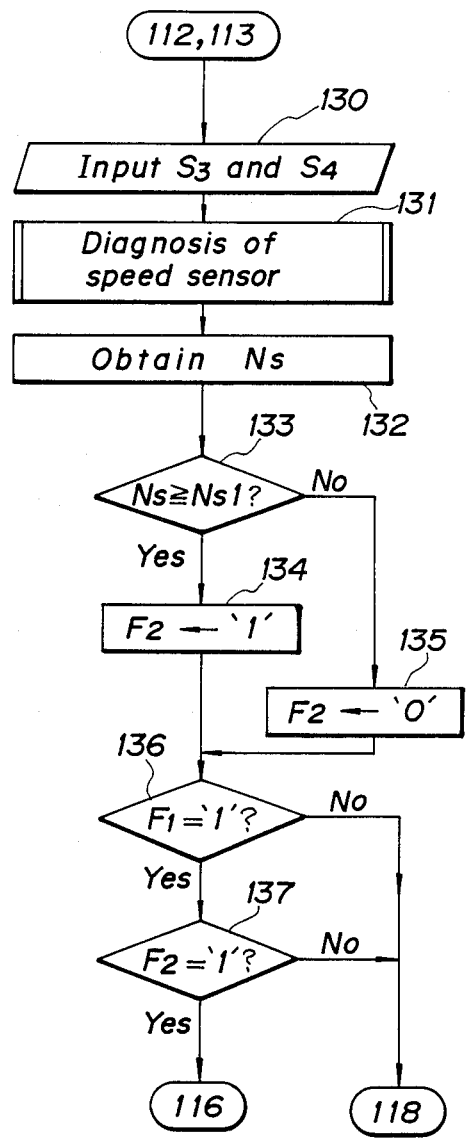
FIG. 6 is a flowchart of a portion of the control sequence executed by a microomputor in the control device shown in FIG. 2.
Figure 9A:
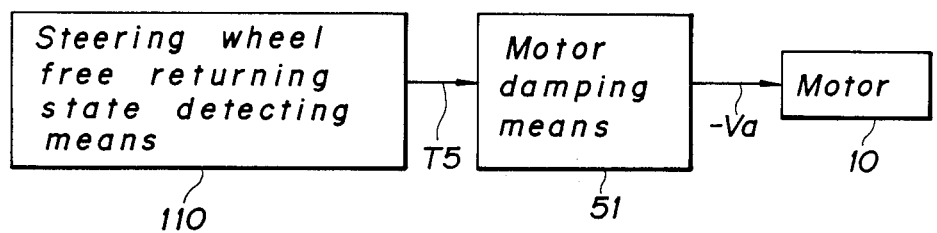
FIG. 9A is a functional block diagram of a basic control system of the present invention.
Figure 9B:
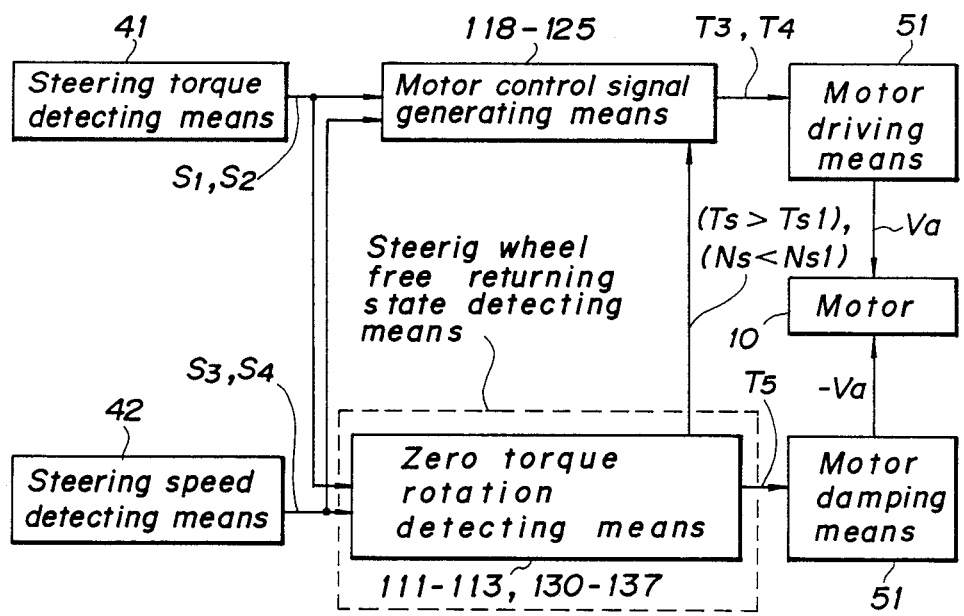
FIG. 9B is a functional block diagram of the conrol device shown in FIG. 2.

FIG. 9A shows in block form the basic functions of the control device 13 by relating the various components of the control device 13 shown in FIG. 2 to the steps of the flowcharts of FIGS. 3 and 6, with motor driving means and detector means omitted from illustration. FIG. 9B shows in greater detail the functional block diagram of FIG. 9A. In this embodiment, the means for detecting the freely returning state of the steering wheel comprises only means for detecting zero torque of the steering wheel.

Figure 8E:
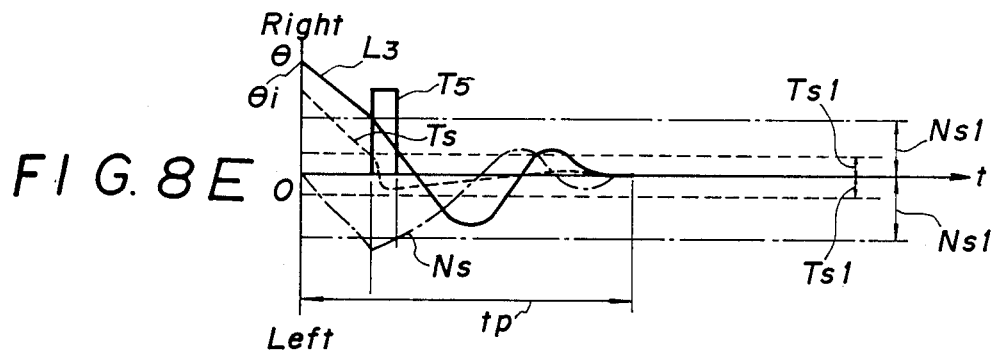
FIG. 8E is a graph illustrative of the manner in which the steering angle of a steering wheel of the motor-driven power steering system of FIG. 1 varies when the steering wheel is in freely returning state.

As a result of the aforesaid processing, the damping signal T5 is produced when the steering wheel passes in the vicinity of the neutral position ($\theta = 0$) in the freely returning state thereof, as shown in FIG. 8E. Therefore, any overshooting of the steering wheel at the neutral position is reduced. Under the same conditions as those described with respect to FIG. 8A, the steering angle $\theta$ varies according to a curve L3 shown in FIG. 8E.

In the above embodiment, the steering torque Ts and the steering speed Ns are utilized to detect when the steering wheel is in the freely returning state. That is, when the steering torque Ts is close to zero and the steering speed Ns is not zero, it is determined that the steering wheel is in the freely returning state. Inasmuch as the damping signal T5 is issued when the steering wheel in its freely returning state passes in the vicinity of the neutral position ($\theta = 0$), the value of Ns1 is selected to be relatively large. In this connection, if the damping signal T5 is produced in a range which meets the two conditions: Ts<Ts1 and Ns>Ns1 in FIG. 8B, the damping signal T5 continues as shown in FIG. 8C. However, FIG. 8B itself shows the manner in which the steering angle of a motor-driven power steering system with no damping signal T5 varies. In reality, where there is a damping signal T5, the steering angle $\theta$ is affected thereby at the same time that the damping signal T5 starts being produced, and varies according to the curve L3 of FIG. 8E. The time in which the steering wheel settles to the neutral position is tp that is substantially equal to the settling time tm in the manually operated steering system. Therefore, the steering wheel of the motor-driven power steering system of the present invention quickly returns or settles to its neutral position in the freely returning state thereof.

FIGS. 10, 11, 12, 13A and 13B illustrate a motor-driven power steering system 150 for a vehicle according to a first modification. The system arrangement and control device employed in the power steering system 150 are substantially the same as those shown in FIGS. 1 and 2, and hence are not shown in detail. Those parts of the first modification, as well as second through sixth modifications and a second embodiment (described later on), which are identical to those of the first embodiment are denoted by identical reference characters, and will not be described.

As shown in FIG. 10, the power steering system 150 includes a sensor 151 for detecting the middle or neutral position of the steering wheel. The sensor 151 comprises a disk 151a fixed to the input shaft 2 and having a slit 151b defined in a prescribed position, and a photocoupler 151c positioned so that it will be aligned with the slit 151b when the input shaft 2 comes to the neutral position. An output signal from the sensor 151 is fed to an interface 152, which converts the output signal to a DC voltage signal S5 and applies the same to the MCU 40 via the A/D converter 43. When the input shaft 2 reaches the neutral position, the signal S5 is of a high level, and when the input shaft 2 is angularly positioned otherwise, the signal S5 is low in level. Thus, the signal S5 serves as a signal for detecting the neutral position of the steering wheel. Instead of the sensor 151, a conventional steering angle sensor having a code wheel may be employed for detecting the neutral position of the steering wheel.

The MCU 40 is supplied with the steering torque signals S1, S2 and the steering speed signals S3, S4 in addition to the neutral position signal S5. The MCU 40 shown in FIG. 10 executes an operation sequence shown in FIG. 11 in addition to the operation sequences illustrated in FIGS. 3 and 6.

More specifically, if the second condition flag F2 is set to "1" in the step 137 (FIG. 6), control goes from the step 137 to a step 160 (FIG. 11), rather than directly to the step 116, in which the signal S5 is read in. A next step 161 then ascertains whether the signal S5 is high or not thereby to determine if the steering wheel is in the neutral position or not. If the steering wheel is in the neutral position, control goes to the step 116. If not in the neutral position, then control goes to a step 162 in which the duty ratio D is set to "0", and then to the step 123. In case control comes to the step 160, the conditions Ts<Ts1 and Ns>Ns1 have already been met, and hence the steering wheel is in the freely returning state.

Figure 12:
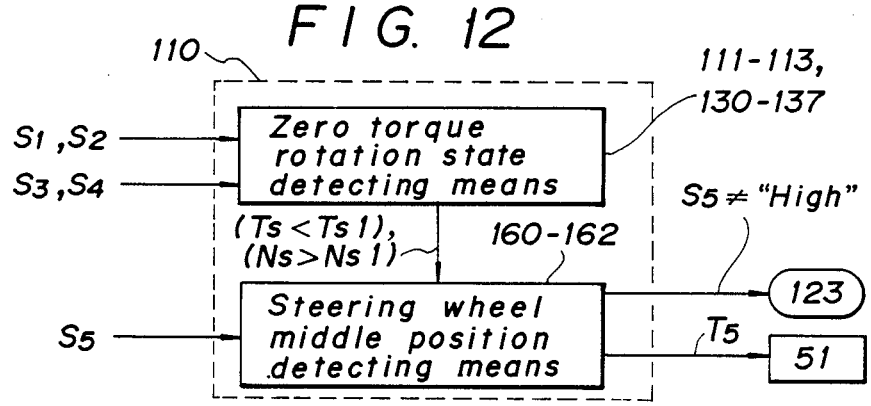
FIG. 12 is a functional block diagram of the power steering system of FIG. 10.

FIG. 12 is a functional block diagram of the means for detecting the freely returning state of the steering wheel according to the first modification. Thus, the functional block diagram is a substitute for the means for detecting the freely returning state of the steering wheel in FIG. 9B.

When the steering wheel turns past the neutral position in the freely returning state, the control signal T5 is produced as shown in FIG. 13B. FIG. 13A shows the curve L2 of FIG. 8B for comparison with the curve of FIG. 13B. As shown in FIG. 8B, the steering speed Ns is maximum when the steering wheel moves past the neutral position. Therefore, the self-damping current Ii of the motor 10 is large when the signal T5 is issued at the timing of FIG. 13B. The steering angle $\theta$ varies according to the curve L4, and a settling time Tp' for the steering wheel to settle to the neutral position is slightly shorter than the settling time tp of the first embodiment. As a consequence, the steering wheel in the freely returning state quickly returns to the neutral position.

The sensor 151 may be replaced with a sensor for detecting the neutral position of the rack shaft 3.

A motor-driven power steering system 200 for a vehicle according to a second modification is illustrated in FIGS. 14 through 16.

The power steering system 200 includes a steering angle sensor 201 (FIG. 14) in addition to the steering torque sensor 6 and the steering speed sensor 5. The steering angle sensor 201, which may be of a conventional design, detects the rotational angle of the input shaft 2. An output signal from the steering angle sensor 201 is applied to an interface 202 and converted thereby to a DC voltage signal S6, which is delivered through the A/D converter 43 to the MCU 40.

The MCU 40 is supplied with the steering torque signals S1, S2 and the steering speed signals S3, S4 in addition to the steering angle signal S6. The MCU 40 of FIG. 14 executes an operation sequence shown in FIG. 15 in addition to the operation sequences illustrated in FIGS. 3 and 6.

More specifically, if the second condition flag F2 is set to "1" in the step 137 (FIG. 6), control goes from the step 137 to a step 210 (FIG. 15), rather than directly to the step 116, in which the signal S6 is read in to detect the steering angle $\theta$. A next step 211 then ascertains whether the steering angle $\theta$ is smaller than a prescribed value $\theta a$ thereby to determine if the steering wheel is in the vicinity of neutral position or not. If the steering wheel is in the vicinity of the neutral position, control goes to the step 116. If not, then control goes to a step 212 in which the duty ratio D is set to "0", and then to the step 123. In case control comes to the step 210, the conditions Ts<Ts1 and Ns>Ns1 have already been met, and hence the steering wheel is in the freely returning state. The second modification is quite similar to the first modification.

When the steering wheel turns past the neutral position in the freely returning state, the control signal T5 is produced as shown in FIG. 16. The steering angle $\theta$ varies according to a curve L5, and a settling time t" for the steering wheel to settle to the neutral position is approximately the same as the settling time tp' of the first modification. Therefore, the steering wheel in the freely returning state quickly returns to the neutral position.

Figure 17:
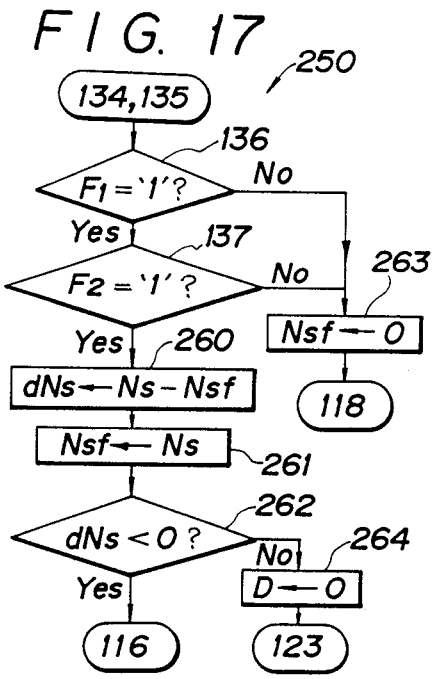
FIG. 17 is a flowchart of a portion of the control sequence of a motor-driven power steering system according to a third modification.

A motor-driven power steering system 250 for a vehicle according to a third modification will be described with reference to FIGS. 17 and 18. The system arrangement and control device employed in the power steering system 250 are substantially the same as those shown in FIGS. 1 and 2, and hence are not shown in detail. The MCU 40 executes an operation sequence shown in FIG. 17 instead of the operation sequences of FIGS. 3 and 6.

If the second condition flag F2 is set to "1" in the step 137 (FIG. 6), control goes from the step 137 to a step 260 (FIG. 17), rather than directly to the step 116. In the step 260, the steering speed Nsf in the preceding processing loop is subtracted from the steering speed Ns at this time to find a steering acceleration dNs. In this connection, the steering speed Ns is of an absolute value as described with reference to the step 132 of FIG. 6, and hence is always positive. If the steering wheel is not in the freely returning state, the preceding steering speed Nsf is set to "0" in a step 263 before control goes from the step 136 or 137 to the step 118. The step 260 is followed by a step 261 in which the preceding steering speed Nsf is replaced with the steering speed Ns at this time.

A step 262 ascertains whether the steering acceleration dNs is negative or not. If negative, then control proceeds to the step 116. If not, then the duty ratio D is set to "0" in a step 264, and control goes therefrom to the step 123. In case control comes to the step 260, the conditions Ts<Ts1 and Ns>Ns1 have already been met, and hence the steering wheel is in the freely returning state.

With the steering wheel in the freely returning state, the steering speed Ns is maximum when the steering wheel turns past the neutral position. Therefore, the sign of the steering acceleration dNs changes from positive to negative at that time. In this modification, the neutral position of the steering wheel is detected by the processing of FIG. 17, rather than using the neutral position sensor 151 as shown in FIG. 10.

When the steering wheel turns past the neutral position in the freely returning state, the control signal T5 is produced as shown in FIG. 15. The steering angle $\theta$ varies according to a curve L6, and a settling time t''' for the steering wheel to settle to the neutral position is approximately the same as the settling time tp' of the first modification. Therefore, the steering wheel in the freely returning state quickly returns to the neutral position.

A motor-driven power steering system 300 for a vehicle according to a second embodiment will be described with reference to FIGS. 19 through 22. The power steering system 300 includes a sensor 301 for detecting the rotational speed Nm of the motor 10, instead of the steering speed sensor 5 of the system shown in FIG. 1. The rotational speed Nm of the motor 10, rather than the rotational speed of the steering wheel, is utilized because the motor and the steering wheel are simultaneously rotated by the dirigible wheels while the steering wheel is in the freely returning state. The description regarding the steering speed Ns in the first embodiment and the first through third modifications is equally applicable to the motor speed Nm referred to hereinbelow.

The sensor 301 comprises a disk 302 fixed to one end of the rotatable shaft 10b of the motor 10 and having a slit 303, and a photocoupler 304 for detecting light that has passed through the slit 303 of the disk 302. The photocoupler 304 applies a pulse signal S7 having a frequency dependent on the rotational speed Nm of the motor 10 to the control device 13. The pulse signal S7 is then delivered via a frequency-to-voltage converter (not shown) to the MCU 40. The pulse signal S7 is therefore a signal indicative of the detected motor speed. The sensor 301 may be replaced with a known speed sensor for detecting the rotational speed of the motor 10.

Figure 20:
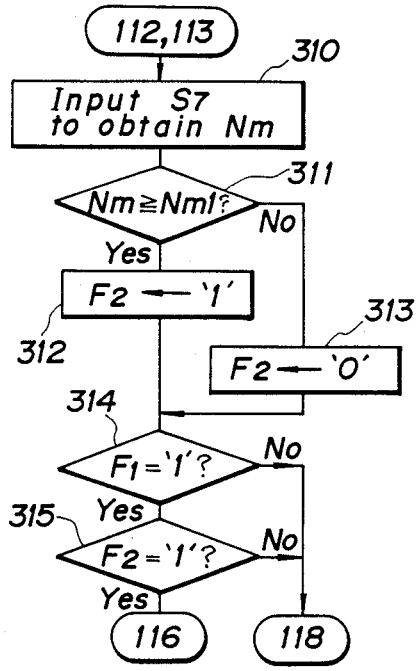
FIG. 20 is a flowchart of a portion of the control sequence of the power steering system of FIG. 19.

In the second embodiment, an operation sequence shown in FIG. 20 is executed instead of the operation sequence of the first embodiment illustrated in FIG. 6.

Figure 21:
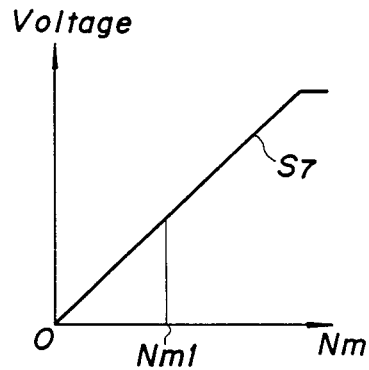
FIG. 21 is a graph of a motor speed signal.

In a step 310, the detected signal S7 is read from the motor speed sensor 301 and the absolute value of the motor speed Nm is obtained. The value of the signal s7 and the absolute value of the motor speed Nm are related to each other as shown in FIG. 21. Then, a step 311 ascertains whether the motor speed Nm is larger than a prescribed motor speed Nm1 having a relatively large value. The prescribed motor speed Nm1 is selected to correspond to the prescribed steering speed Ns1 of FIG. 8B.

If Nm is equal to or larger than Nm1, then the second condition flag F2 is set to "1" in a step 312. If Nm is smaller than Nm1, then the second condition flag F2 is set to "0" in a step 313. Steps 314, 315 check if the first and second condition flags F1, F2, respectively, are set to "1" or not. The first condition flag F1 has been determined in the step 112 or 113 of FIG. 3. If both of the flags F1, F2 are set to "1", then it is determined that the steering wheel is in the freely returning state, and control goes to the step 116 of FIG. 3. If at least one of the flags F1, F2 is not set to "1", then it is determined that the steering wheel is not in the freely returning state, and control goes to the step 118 of FIG. 3.

Figure 22:
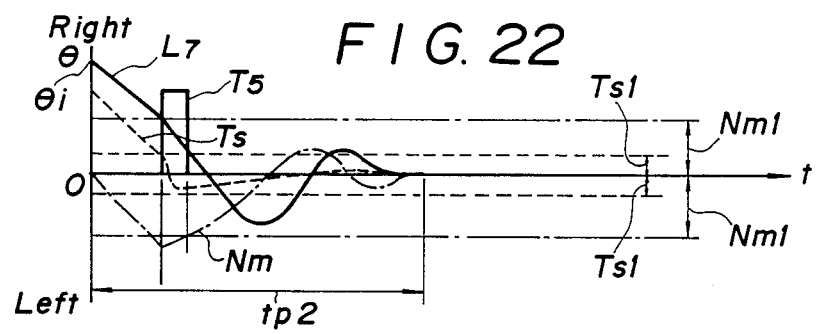
FIG. 22 is a graph showing the manner in which which the steering angle of a steering wheel of the motor-driven power steering system shown in FIG. 19 varies under freely returning state.

When the steering wheel turns past the neutral position in the freely returning state, the control signal T5 is produced as shown in FIG. 22. The steering angle $\theta$ varies according to a curve L7, and a settling time tp2 for the steering wheel to settle to the neutral position is approximately the same as the settling time tp shown in FIG. 8E. Therefore, the steering wheel in the freely returning state quickly returns to the neutral position.

Figure 23:
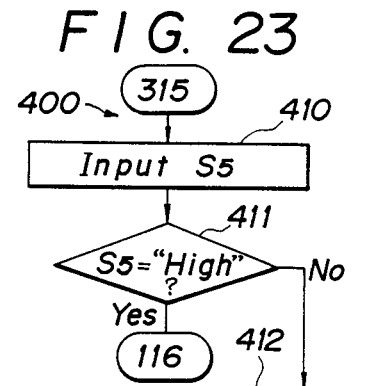
FIG. 23 is a flowchart of a portion of the control sequence of a motor-driven power steering system of a fourth modification.

FIG. 23 shows a motor-driven power steering system 400 for a vehicle according to a fourth modification. The system arrangement and control device employed in the power steering system 400 are substantially the same as those shown in FIG. 19, and hence are not shown in detail.

The power steering system 400 additionally includes the sensor 151 for detecting the neutral position of the steering wheel as shown in FIG. 10.

The MCU 40 is supplied with the steering torque signals S1, S2 and the motor speed signal S7 in addition to the neutral position signal S5. The MCU 40 executes an operation sequence shown in FIG. 23 in addition to the operation sequences illustrated in FIGS. 3 and 20.

More specifically, if the second condition flag F2 is set to "1" in the step 315 (FIG. 20), control goes from the step 315 to a step 410 (FIG. 23), rather than directly to the step 116, in which the signal S5 is read in. A next step 411 then ascertains whether the signal S5 is high or not thereby to determine if the steering wheel is in the neutral position or not. If the steering wheel is in the neutral position, control goes to the step 116. If not in the neutral position, then control goes to a step 412 in which the duty ratio D is set to "0", and then to the step 123. In case control comes to the step 410, the conditions Ts<Ts1 and Nm>Nm1 have already been met, and hence the steering wheel is in the freely returning state.

The control signal T5 is produced when the steering wheel turns past the neutral position in the freely returning state. The control signal T5 is issued at substantially the same timing as that shown in FIG. 13B. Consequently, the steering wheel in the freely returning state quickly returns to the neutral position.

A motor-driven power steering system 450 for a vehicle according to a fifth modification will be described with reference to FIG. 24. The power steering system 450 includes the steering angle sensor 210 shown in FIG. 14 in addition to the steering torque sensor 6 and the motor speed sensor 301.

The MCU 40 is supplied with the steering torque signals S1, S2 and the motor speed signal S7 in addition to the steering angle signal S6. The MCU 40 executes an operation sequence shown in FIG. 24 in addition to the operation sequences illustrated in FIGS. 3 and 20.

Figure 24:
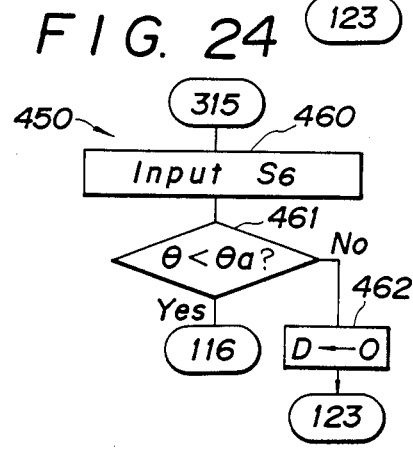
FIG. 24 is a flowchart of a portion of the control sequence of a motor-driven power steering system of a fifth modification.
Figure 19:
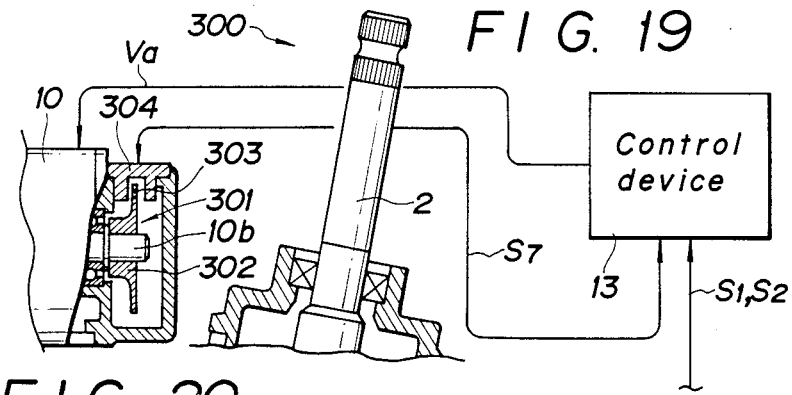
FIG. 19 is a fragmentary cross-sectional view, partly in block form, of a motor-driven power steering system according to a second embodiment of the present invention.

In FIG. 24, if the second condition flag F2 is set to "1" in the step 315 (FIG. 20), control goes from the step 315 to a step 460, rather than directly to the step 116, in which the signal S6 is read in to detect the magnitude of the steering angle θ. A next step 461 then ascertains whether the steering angle θ is smaller than the prescribed small value θa shown in FIG. 16 or not to determine if the steering wheel is near the neutral position or not. If the steering wheel is near the neutral position, control goes to the step 116. If not, then control goes to a step 462 in which the duty ratio D is set to "0", and then to the step 123. In case control comes to the step 460, the conditions Ts<Ts1 and Nm>Nm1 have already been met, and hence the steering wheel is in the freely returning state. The fifth modification substantially corresponds to the second modification.

The control signal T5 is produced when the steering wheel turns past the neutral position in the freely returning state. The control signal T5 is issued at substantially the same timing as that shown in FIG. 13B. Consequently, the steering wheel in the freely returning state quickly returns to the neutral position.

Figure 25:
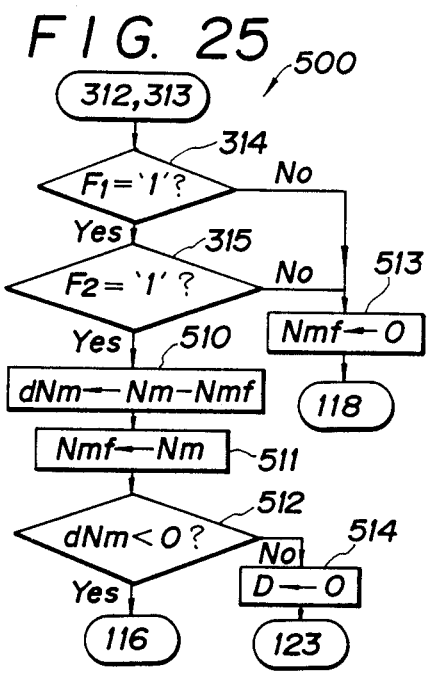
FIG. 25 is a flowchart of a portion of the control sequence of a motor-driven power steering system of a sixth modification.

FIG. 25 is illustrative of a motor-driven power steering system 500 according to a sixth modification. The system arrangement and control device employed in the power steering system 500 are substantially the same as those shown in FIG. 19, and hence are not shown in detail. The MCU 40 executes an operation sequence shown in FIG. 25 instead of the operation sequences of FIGS. 3 and 20.

If the second condition flag F2 is set to "1" in the step 315 (FIG. 20), control goes from the step 315 to a step 510 (FIG. 25), rather than directly to the step 116. In the step 510, the motor speed Nmf in the preceding processing loop is subtracted from the motor speed Nm at this time to find a motor acceleration dNm. In this connection, the motor speed Nm is of an absolute value as described with reference to the step 310 of FIG. 20, and hence is always positive. If the steering wheel is not in the freely returning state, the preceding motor speed Nmf is set to "0" in a step 513 before control goes from the step 134 or 135 to the step 118. The step 510 is followed by a step 511 in which the preceding motor speed Nmf is replaced with the motor speed Nm at this time.

A step 512 ascertains whether the motor acceleration dNm is negative or not. If negative, then control proceeds to the step 116. If not, then the duty ratio D is set to "0" in a step 514, and control goes therefrom to the step 123. In case control comes to the step 510, the conditions Ts<Ts1 and Nm>Nm1 have already been met, and hence the steering wheel is in the freely returning state.

With the steering wheel in the freely returning state, the motor speed Nm is maximum, like the steering speed Ns of FIG. 8B, when the steering wheel turns past the neutral position. Therefore, the sign of the motor acceleration dNm changes from positive to negative at that time. In this modification, the neutral position of the steering wheel is detected by the processing of FIG. 25, rather than using the neutral position sensor 151 as shown in FIG. 10.

Figure 18:
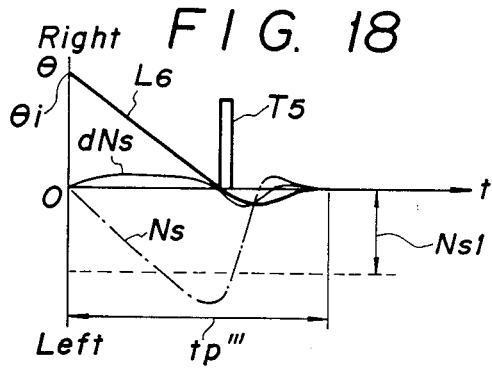
FIG. 18 is a graph illustrative of the manner in which the steering angle of a steering wheel of the motor-driven power steering system of the third modification varies under freely returning state.

When the steering wheel turns past the neutral position in the freely returning state, the control signal T5 is produced at substantially the same timing as that shown in FIG. 18. Therefore, the steering wheel in the freely returning state quickly returns to the neutral position.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motor-driven power steering system for a vehicle, comprising:
   an input shaft operatively coupled to a steering wheel;
   an output shaft operatively coupled to a dirigible wheel;
   an electric motor for applying an assistive torque to said output shaft;
   torque detecting means for detecting a steering torque imposed on said input shaft;
   control means responsive to output signals from said torque detecting means for applying a driving signal to said electric motor;
   freely returning state detecting means for detecting a freely returning state of the steering wheel to generate a motor damping signal; and damping means responsive to the motor damping signal for damping said electric motor.

2. A motor-driven power steering system according to claim 1, wherein said freely returning state detecting means comprises said torque detecting means and a rotational speed detecting means for detecting a rotational speed of said steering wheel, and wherein said freely returning state detecting means generates said motor damping signal when said steering torque is smaller than a presecribed steering torque and said steering speed is larger than a prescribed steering speed.

3. A motor-driven power steering syatem according to claim 2, wherein said freely returning state detecting means further includes a neutral position detecting means for detecting the condition that a said steering wheel is in the vicinity of a neutral position, and wherein said freely returning state detecting means generates said motor damping signal when said steering wheel passes in the vicinity of the neutral position.

4. A motor-driven power steering system according to claim 3, wherein said neutral position detecting means comprises a means for detecting a steering angle of said steering wheel.

5. A motor-driven power steering system according to claim 3, wherein said neutral position detecting means comprises a means for detecting the condition that a steering aceleration of said steering wheel is negative.

6. A motor-driven power steering system according to claim 2, wherein said prescribed steering torque has a relatively small value and said prescribed steering speed has a relatively large value.

7. A motor-driven power steering system according to claim 1, wherein said freely returning state detecting means comprises said torque detecting means and a rotational speed detecting means for detecting a rotational speed of said electric motor, and wherein said freely returning state detecting means generates said motor damping signal when said steering torque is smaller than a prescribed steering torque and said rotational speed of said electric motor is larger than a prescribed motor speed.

8. A motor-driven power steering system according to claim 7, wherein said freely returning state detecting means further includes a neutral postion detecting means for detecting the condition that said steering wheel is in the vicinity of a neutral position, and wherein said freely returning state detecting means generates said motor damping signal when said steering wheel passes in the vicinity of the neutral position.

9. A motor-driven power steering system according to claim 8, wherein said neutral position detecting means comprises a means for detecting a steering angle of said steering wheel.

10. A motor-driven power steering system according to claim 8, wherein said neutral position detecting means comprises a means for detecting the condition that a rotational acceleration of said electric motor is negative.

11. A motor-driven power steering system according to claim 7, wherein said prescribed steering torque has a relatively small value and said prescribed motor speed has a relatively large value.

* * * * *